Oct. 27, 1942.  A. R. ALLBRIGHT  2,299,723
RODENT POISON FEEDER
Filed April 16, 1941
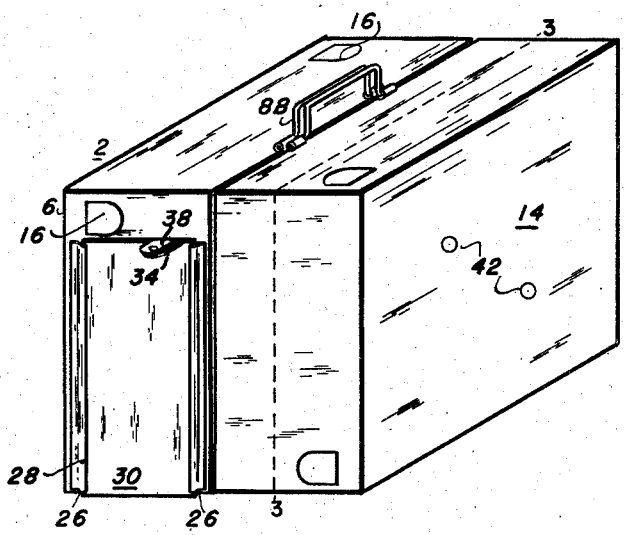
FIG. 1
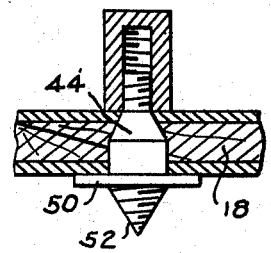
FIG. 8
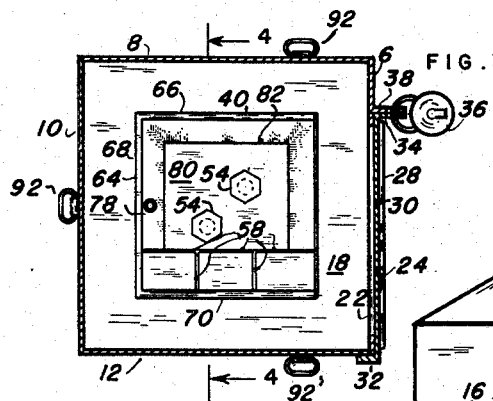
FIG. 3
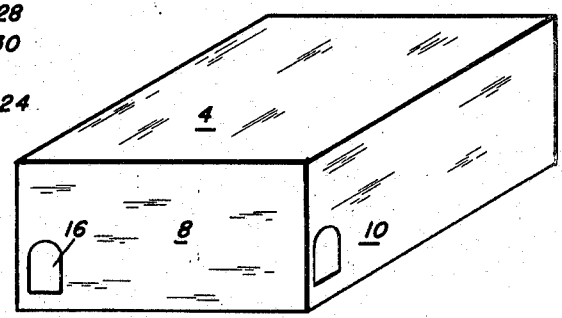
FIG. 2
FIG. 4
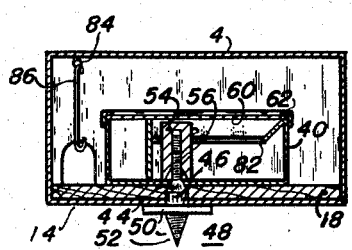
FIG. 5
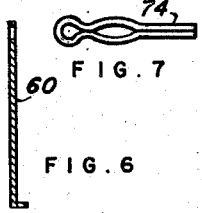
FIG. 7
FIG. 6
ALLEN R. ALLBRIGHT
INVENTOR
BY
ATTORNEY Patented Oct. 27, 1942

2,299,723

UNITED STATES PATENT OFFICE 2,299,723

RODENT POISON FEEDER

Allen R. Allbright, Oakland, Calif.

Application April 16, 1941, Serial No. 388,806

1 Claim. (Cl. 43—131)

This invention relates to a device for feeding poison to only certain animals, and is particularly concerned with several improved features of practical importance as they affect safety of humans and animals other than animals trapped, protection against theft of the feeder or unauthorized interference, sturdiness and portability, convenience, etc., as will more fully appear hereinafter.

Other objects will become apparent from the following as considered in connection with the accompanying drawing, in which:

Figure 1 is a view of two of the feeders arranged for carrying by one hand;

Figure 2 is a view of one feeder as appearing in use;

Figure 3 is a horizontal section along the lines 3—3 of Figure 1;

Figure 4 is a section at 4—4 of Figure 3, with feed tray covered;

Figure 5 is a plan of a cover for the feeder tray;

Figure 6 is a section of the cover of Figure 5;

Figure 7 is a view of a simple form of latch for the tray cover; and

Figure 8 is an enlargement of a portion of Fig. 4.

The drawing illustrates a substantially integral housing or envelope 2 having the roof 4, sides 6, 8, 10, and 12, and bottom 14, all of metal panels for example, brazed along the joints to form a substantially sealed container except as provision is made for entrance and exit of the intended victims via ports 16 provided adjacent each corner. The lower edges of ports 16 are on the level of the upper surface of a wooden floor 18 so that water will not enter below the port threshold and a relatively dry rodent inviting wooden floor is maintained even in wet surroundings such as in sheds, docks, restaurants, and out of doors.

One sidewall 6 has an authorizable access doorway 22 and sliding door 30 sliding in ways 26 formed by the wall edges above and below the doorway and groove forming strips 28 brazed thereto. A panel 24 having an end lap 32 and a fastener 34 angled therefrom forms the removable door 30 which is to be locked by a padlock 36 passing through fastener 34 and the wall secured angle plate 38.

The feeding tray 40 proper is removable through the doorway only when the door is open, and the size of the ports is such that no human, or valuable animal, can have access to the tray unless the door be unlocked.

In order to prevent theft of the structure, as well as to prevent persons or animals from upsetting the feeder and the tray so as to spill the contents out through the ports 16, means are provided for fastening and unfastening the feeder to a floor or to the ground, which means are accessible only from within the feeder, access to which is deniable by the locked door. Accordingly, the bottom of the feeder is provided with holes 42 which have tapered seats for receiving the tapered reduced portion 44 of the feeder received shank 46 of anchor fitting 48 which may comprise a table forming disc 50 and a wood screw 52.

The tapered portion of the anchor fitting 48 forms a seal in the floor, it being compressed by a long nut 54 screw threaded on the fitting threaded shank 56 against the tapered seats of holes 42. Shank 56 extends upwardly through and above the tray bottom for ease of access and location by the hand inserted into the feeder to fasten the nut 54, but its top and the top of the nut, are so proportioned that they terminate below the tray coverway, and shank 56 is so short that it permits removal of the tray through the door.

It is preferred that the feeding tray proper should also be fastened, and in the middle of the floor 18, by the fittings 48 in order to reduce the number of parts. The tray proper comprises a sheet metal open topped container having partition walls 58 with their top edges lying in a common plane so that a tray cover 60, sliding in grooves 62 formed by flanges 64 fastened to three edges 66, 68, and 70 of the tray, may fully close each separate compartment against poisoned food being spilled out.

The cover 60 slides on and off the tray from the doorway of the housing, the fittings 48 and holes 42 through the bottoms of the housing and the tray being located to insure this arrangement. The cover 60 is detachably secured to the tray against sliding therefrom by a pin 74 similar to a cotter pin, passing through holes 76 and 78 in cover and tray.

The grain compartment 80 of the feeding tray is provided with a sloping wall 82 on its inner side, the effect of which is to scrape poisoned grain from the under portions of a rat's body as it leaves the grain bin, the purpose being to minimize the grain carried out by the animal and dropped outside the feeder where chickens or the like might find and eat it.

A short distance within the ports 16, the roof of the housing is provided with interiorly projecting lure-anchor loops 84 to which are removably securable lure hooks 86 to which lure bait may be fastened to entice the victim to and through the ports 16.

Each feeder unit has a bail handle 88 fastened to the mid-region of one edge, preferably a long edge, so that two feeders can be carried with one hand as one, and as illustrated in Figure 1.

In the use of the feeder, as illustrated in Figure 4, the feeder is in condition to be carried from one point to another, the bait and lures being held in the tray by the tray cover and the tray being fastened in position within the feeder housing by the fitting 48 as described. The padlocking of the door can be effected during transport or storage, to prevent any possible interference with the contents of the tray.

When the feeder is placed on a poisoning site, the door is unlocked and the tray cover is removed. The fitting nut is now taken off, the fitting 48 removed, and the feeding tray is removed for inspection, cleaning, and recharging with poisoned food.

The fittings 48 are fastened to the floor or other permanent base, and then the housing and charged tray are placed over the fittings so as to pass the threaded shanks thereof through the housing floor, and into the tray. The fitting nuts are then fastened down to secure the tray to the housing floor, the lures are placed, if required, and the door emplaced and locked. In this condition, only the animals able to pass ports 16 can obtain poison.

Since the fitting 48 cannot be reached readily, it will be appreciated that the feeder cannot be removed by unauthorized persons; nor can it be upset to spill out the contents as might be done by a coyote or dog were the housing merely resting on the ground and not anchored down.

A plurality of bails 92, as indicated in Fig. 3, may be provided with which the feeder may be anchored by cords to wooden stakes if desired.

I claim:

In a rodent poisoning device, a housing member having walls and bottom and top adapted to prevent access thereto except by a door and suitably sized rodent access openings, a doorway for said housing and a door for said doorway; means for locking said door to close said doorway against unauthorized entry; a tray adapted to contain poison and adapted to be inserted into said housing through said doorway; anchor fittings adapted for screw fastening to a wooden floor and having threaded portions for projecting upward from the floor, holes through the bottoms of the housing member and the tray adapted to receive the projecting portions of the anchor fittings, and means for engaging the threaded projecting portions of the fittings, disposed within the housing, for securing the housing and the tray to such wooden floor, whereby, after the housing door is locked neither the housing nor the tray can be removed from the floor.

ALLEN R. ALLBRIGHT.